July 12, 1927.
J. T. WELCH
1,635,518
ARTIFICIAL BAIT
Filed May 29, 1926
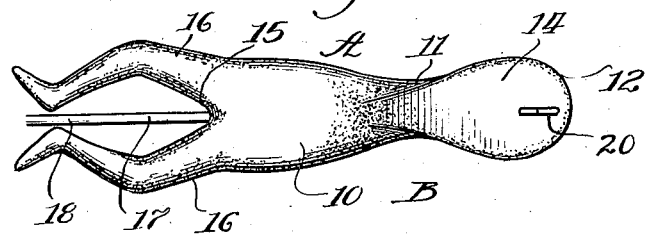
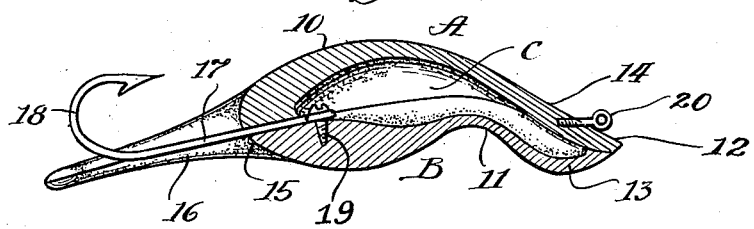
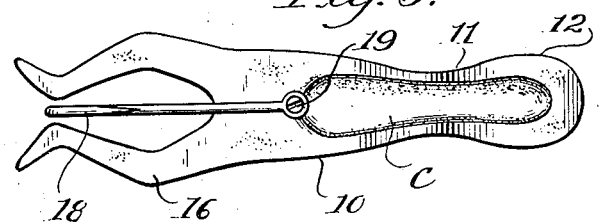
Inventor
Jack T. Welch Patented July 12, 1927.

1,635,518

UNITED STATES PATENT OFFICE.

JACK T. WELCH, OF DOWAGIAC, MICHIGAN, ASSIGNOR TO JAMES HEDDON'S SONS, OF DOWAGIAC, MICHIGAN, A CORPORATION OF MICHIGAN.

ARTIFICIAL BAIT.

Application filed May 29. 1926. Serial No. 112,582.

The present invention relates to a fish bait which is constructed to combine the advantageous properties of a wooden bait of the general character now extensively in use with the special features of a natural frog, and, in particular, the invention relates to the method of constructing the bait in such a way as to throw the preponderance of mass to a point at the rear of the center of buoyancy, so that when the bait is resting in the water, the rear or leg portion thereof will hang obliquely downwardly in simulation of the resting position of a natural frog.

The exterior configuration of the bait is one which, when the line is retrieved, will cause the bait to dart from side to side, and to otherwise move in a manner in simulation of the swimming movements of a live frog. The construction is also one which provides for a peculiarly advantageous positioning of the hook which will, in the preferred form, occupy a position between the leg portions of the bait which will thus serve in large measure to guard the hook against fouling.

Further details will appear from a description of the drawing wherein—

Figure 1 is a top or plan view of the bait;

Fig. 2 is a sectional elevation thereof; and

Fig. 3 is a view of the lower section of the bait through the division line indicated in Fig. 2.

The bait as a whole comprises a pear shaped body portion 10 which is substantially circular in its cross dimensions, which body, at the reduced forward end, merges into a neck 11 which in turn merges into a head 12, which extends obliquely downwardly from the body and is rounded on its under portion 13 and flattened on its front portion 14, which latter, when the bait is being retrieved, affords a flat, obliquely disposed plane surface for impingement against the water which will stream past the sides of the neck in such a way as to hold the bait in a condition of equilibrium, thereby causing the bait to dart from side to side and to move more or less in a vertical direction in simulation of the natural movements of a swimming frog.

The body 10 at its rear end is rounded through the crotch portion 15 of the bait, and terminates in a pair of separated legs 16 in simulation of the legs of a frog. The shank of the hook 17 is entered through the crotch portion, and lies in the medial position between the legs with the barbed hook portion 18 upturned above the plane of the legs.

The special features of construction to which the present invention is mainly directed are concerned with the formation of a body of the shape indicated, which, as shown, is formed of two longitudinally separated sections A and B, the line of division extending longitudinally through the bait from end to end thereof. The two sections are preferably composed of non-buoyant material, such as celluloid or some composition of rubber or the like, and in order to properly distribute the mass of the body in such a way as to cause a sinking of the rear portion thereof when at rest, the interior of the sections is cored out as at C, which coring is so disposed as to throw a preponderance of the material toward the rear of the body and leg portions of the bait with the result that the bait as a whole will be buoyant on account of the hollowing out of its interior, but the natural weight of the material employed in its construction will cause the rear portion to settle down when at rest into the oblique position of a resting frog.

The two sections are cemented or otherwise secured together in a water tight manner, and the forward end of the hook shank is secured within the cord interior of the bait by the provision of a screw 19 or the like, which is entered into the lower section. A line tie 20 is entered into the uncored portion of the head of the bait, which, at this point, affords sufficient stock for the securing of the line tie.

It is obvious that both sections of the bait may be composed of the same non-buoyant material, or, if desired, the bait can be composed of sections of different materials, the object in each case being to afford a greater buoyancy for the forward portion of the bait in order to accomplish the purposes indicated.

I claim:

1. A bait consisting of a body portion of non-buoyant material divided longitudinally into upper and lower sections joined together and cored on its interior to increase the buoyancy of the forward end of the bait to the extent required to cause the bait to assume an oblique position when resting in the water, substantially as described.

2. A bait consisting of a body portion terminating at its rear end in separated legs in simulation of a frog, the bait being divided longitudinally into upper and lower sections joined together, at least one of which is of non-buoyant material, and the bait being cored on its interior toward the forward end thereof to increase the buoyancy of the forward portion of the bait, substantially as described.

3. A bait consisting of a body portion terminating at its rear end in separated legs in simulation of a frog, the bait being divided longitudinally into upper and lower sections joined together, at least one of which is of non-buoyant material, the bait being cored on its interior toward the forward end thereof to increase the buoyancy of the forward portion of the bait, and a hook extending between the legs of the bait and into the cored body portion thereof and secured by suitable attaching means within said body portion to an unseamed portion thereof, substantially as described.

4. A bait consisting of a body portion terminating at its rear end in separated legs in simulation of a frog, the bait being divided longitudinally into upper and lower sections joined together, at least one of which is of non-buoyant material, the bait being cored on its interior toward the forward end thereof to increase the buoyancy of the forward portion of the bait, and a hook extending between the legs of the bait and into the cored body portion thereof and secured by suitable attaching means within said body portion to an unseamed portion thereof, the hook extending rearwardly between the legs and being upturned at its barbed end, substantially as described.

JACK T. WELCH.